United States Patent [19]

Kobayashi et al.

[11] Patent Number: 5,372,894
[45] Date of Patent: Dec. 13, 1994

[54] MAGNETIC RECORDING MEDIA COMPRISING A BACK COAT CONTAINING A MIXTURE OF A THERMOSETTING RESIN AND PHOTOSETTING RESIN AND A PROCESS THEREFOR

[75] Inventors: Osamu Kobayashi, Tomobe; Takayuki Deno, Mito; Kenichi Kikuchi, Mito; Masamichi Saito, Mito; Shigeru Nakano, Mito, all of Japan

[73] Assignee: Victor Company of Japan, Ltd., Yokohama, Japan

[21] Appl. No.: 752,359

[22] Filed: Sep. 3, 1991

[30] Foreign Application Priority Data

Aug. 31, 1990 [JP] Japan .................. 2-231885

[51] Int. Cl.⁵ .................. G11B 5/66; B32B 5/16
[52] U.S. Cl. .................. 428/694 BB; 428/323; 428/694 BC; 428/900
[58] Field of Search ......... 428/694, 900, 323, 694 BB, 428/694 BC

[56] References Cited

U.S. PATENT DOCUMENTS

| | | | |
|---|---|---|---|
| 4,047,232 | 9/1977 | Hisagen et al. .............. | 428/694 X |
| 4,567,083 | 1/1986 | Arioka et al. ............... | 428/141 |
| 4,702,959 | 10/1987 | Shimozawa et al. ......... | 428/323 |
| 4,713,278 | 12/1987 | Yoda et al. .................. | 428/141 |
| 4,789,583 | 12/1988 | Akutsu ........................ | 428/143 |
| 4,794,040 | 12/1988 | Ojima et al. ................ | 428/323 |
| 4,803,120 | 2/1989 | Ogawa et al. ............... | 428/323 |

*Primary Examiner*—Paul J. Thibodeau
*Assistant Examiner*—H. Thi Lê
*Attorney, Agent, or Firm*—Jacobson, Price, Holman & Stern

[57] ABSTRACT

A magnetic recording medium comprising a non-magnetic substrate, a magnetic layer formed at one surface of the substrate, and a back coat layer formed at the other surface of the substrate wherein the back coat layer contains a thermosetting resin and a photosetting resin and its light transmittance is at least 1%. A process for producing a magnetic recording medium which comprises the steps of applying a back coat layer containing a thermosetting resin and a photosetting resin and having a light transmittance of at least 1% to one surface of a non-magnetic substrate; irradiating the back coat layer with a light from both surfaces to carry out photosetting; applying a magnetic layer to the other surface of the non-magnetic substrate; winding the double-coated substrate in the form of a roll; and thermosetting the back coat layer. The magnetic recording media having excellent characteristics can be easily obtained without requiring any complicated apparatus.

3 Claims, 1 Drawing Sheet

MAGNETIC RECORDING MEDIA COMPRISING A BACK COAT CONTAINING A MIXTURE OF A THERMOSETTING RESIN AND PHOTOSETTING RESIN AND A PROCESS THEREFOR

BACKGROUND OF THE INVENTION

This invention relates to a magnetic recording medium such as a magnetic tape and a process therefor and, more particularly, to the improvement of its back coat layer.

Magnetic recording media such as magnetic tapes (hereinafter referred to as "tapes") have a structure wherein a transparent non-magnetic substrate such as polyester is provided with a magnetic layer containing fines of magnetic substance and a binder resin. The non-magnetic substrate has generally electrical insulating property and therefore drawbacks such as drop-out and the reduction in runnability can occur due to foreign matter deposition by charging. The influences of such a charging are reduced by adding a conductive material such as carbon black to the magnetic layer.

There are many apparatus utilizing the difference between the transmitted light in tapes and the transmitted light in leader tapes as mechanisms for detecting the terminal of tapes. In order to successfully carry out such a terminal detection, it is necessary to reduce the light transmittance of the tapes. Accordingly, materials such as carbon black are added to the magnetic layer.

Recently, magnetic recording media having a high density have been increasingly requested. However, the non-magnetic materials such as carbon black described above reduce the magnetic flux density in the magnetic layer and interfere with the high densification of magnetic recording.

An attempt has been carried out to reduce the amount of the non-magnetic material in the magnetic layer by adding such non-magnetic materials to a back coat layer. In this case, a binder resin and a non-magnetic material such as carbon black are contained in the back coat layer. Such a back coat layer comes into contact with a number of guides during the tape running process and therefore high durability is requested. In order to meet such a requirement, the binder resin in the back coat layer is cured. Curing means include thermosetting, electron beam curing and photosetting by ultraviolet light.

However, these curing means pose the following drawbacks. First, thermosetting generally takes a long period of time and therefore the binder resin is cured after the back coat layer is applied to the non-magnetic substrate and thereafter wound in the form of a roll. Accordingly, the back coat layer comes in contact with non-magnetic substrate, whereby the back coat layer is affected by the surface of the non-magnetic substrate.

In electron beam curing, the drawbacks as described in the thermosetting process do not occur. However, the apparatus used is complicated and productivity is low. Further, in the case of photosetting, the back coat layer has a low permeability to a light and therefore the curing of the binder resin does not sufficiently proceed.

SUMMARY OF THE INVENTION

An object of the present invention is to easily obtain a magnetic recording medium having excellent characteristics without requiring a complicated apparatus.

The present invention relates to a magnetic recording medium comprising a non-magnetic substrate, a magnetic layer formed at one surface of said substrate, and a back coat layer formed at the other surface of said substrate wherein said back coat layer contains a thermosetting resin and a photosetting resin and its light transmittance is at least 1%.

Further, the present invention relates to a process for producing a magnetic recording medium which comprises the steps of applying a back coat layer containing a thermosetting resin and a photosetting resin and having a light transmittance of at least 1% to one surface of a non-magnetic substrate; irradiating said back coat layer with a light from both surfaces to carry out photosetting; applying a magnetic layer to the other surface of said non-magnetic substrate; winding the double-coated substrate in the form of a roll; and thermosetting said back coat layer.

DETAILED DESCRIPTION OF THE INVENTION

Figure 1A:
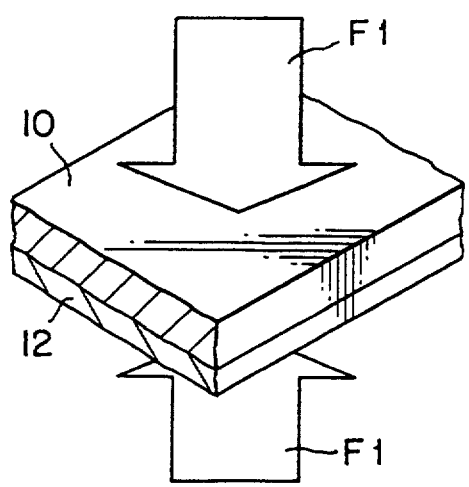
FIG. 1 is a view showing one embodiment of a process for producing a magnetic recording medium according to the present invention.

A magnetic recording medium according to the present invention is characterized in that a photosetting resin and a thermosetting resin are contained in a back coat layer. In accordance with a process for producing a magnetic recording medium according to the present invention, the photosetting resin in the back coat layer is cured, the magnetic layer is then formed and the double-coated substrate is wound in the form of a roll. The influence of back coat layer surface by the non-magnetic substrate in the roll state is reduced by such a photosetting. Heating is carried out in the roll state to carry out curing of the thermosetting resin. Thereby, the back coat layer is sufficiently cured and thus magnetic recording media having the back coat layer exhibiting excellent antistatic property, light screen property, surface property and durability are obtained.

Further, the present invention is characterized in that the light transmittance of the back coat layer described above is at least 1%. If the light transmittance of the back coat layer is less than 1%, the reaction of the photosetting resin will be insufficient in some portions and the unreacted resin will deposit on the surface of the back coat layer. If the light transmittance of the back coat layer is more than 50%, the light screening property in the terminal detection of the tapes described above will be insufficient.

The well-known materials are used as materials from which layers of the magnetic recording media according the present invention are produced. For example, the materials from which the non-magnetic substrate produced include polyethylene terephthalate, polyethylene naphthalate, and other materials disclosed in Japanese Patent Laid-Open Publication No. 49217/1990. This publication discloses various examples of materials from which the magnetic layer and the back coat layer are produced.

The thermosetting resins used in the back coat layer may be any thermosetting resins provided that thermal crosslinking reaction occurs. Examples of materials from which the back coat layer is produced include polyurethane resins, polyester resins, vinyl chloride copolymers, cellulose resins, epoxy resins, acrylic resins, polyolefin resins, and polycarbonate resins. These thermosetting resins may be used alone. Alternatively, a reactive material such as thermosetting agent such as a polyfunctional isocyanate may be added to the thermosetting resins and the resulting mixture may be heated and cured.

The known various photosetting resins can be used as the photosetting resins. Examples of such photosetting resins include resins having unsaturated double bond such as vinyl, allyl, acryloyl and methacryloyl groups and resins having groups such as epoxy groups. From the standpoint of curing property, radical polymerization-type resins such as unsaturated polyesters and polyacrylates; radical addition-type resins such as polyenes and polythiols; cationic polymerization-type resins such as epoxy resins are used.

In particular, acrylate resins having (meth)acryloyl groups are generally used. Examples of such acrylate resins include urethane (meth)acrylates, epoxy (meth)acrylates, polyester (meth)acrylates, polyol (meth)acrylates, polybutadiene (meth)acrylates, melamine (meth)acrylates, polyacetal (meth)acrylates, silicon (meth)acrylates, polyamide (meth)acrylates, heterocyclic ring-containing (meth)acrylates.

The thermosetting resin is desirably present at a level of from 5 to 95% by weight based on the total amount of the thermosetting resin and the photosetting resin, and the photosetting resin is desirably present at a level of from 5 to 95% by weight based on the total amount of the thermosetting resin and the photosetting resin. If the amounts of thermosetting resin and the photosetting resin are outside the ranges described above, there will be obtained only an effect similar to that obtained by using the thermosetting resin or the photosetting resin alone.

In order to obtain a back coat layer having a light transmittance of at least 1%, known materials such as pigments and carbon black are used to adjust the light transmittance. Further, fillers such as alumina, $SiO_2$, $CaCO_3$ may be used in a proper amount.

Example of the magnetic recording media and the process therefor according to the present invention is described with reference to the attached drawing.

a. Sample 1

A composition having the following formulation and weight ratios was prepared.

| | |
|---|---|
| Toluene | 40 parts by weight |
| Cyclohexanone | 40 parts by weight |
| Carbon black (particle size: 17 μm) | 10 parts by weight |
| Nitrocellulose | 5 parts by weight |
| Polyurethane (manufactured by Nippon Polyurethane Industry Co., Nipporan N2301) | 5 parts by weight |

Of these, toluene and cyclohexanone are solvents and nitrocellulose and polyurethane are thermosetting resins. Carbon black was added to the back coat layer in order to reduce the amount of the non-magnetic material in the magnetic layer as described above.

These components were then mixed and dispersed. Thereafter, a photosetting resin composition having the following formulation and weight ratios was added thereto and stirred.

| | |
|---|---|
| Polyester acrylate (manufactured by Toagosei Chemical Industry Co.; Aronix M 9050) | 20 parts by weight |

| -continued | |
|---|---|
| Photopolymerization initiator (manufactured by Ciba-Geigy (Japan); Irgacure 907) | 1 part by weight |
| Methyl ethyl ketone | 10 parts by weight |
| Toluene | 10 parts by weight |

Of these, polyester acrylate is a photosetting resin and methyl ethyl ketone and toluene are solvents.

The following thermosetting agent was added to the composition described above to obtain a coating for a back coat.

| | |
|---|---|
| Isocyanate curing agent (manufactured by Nippon Polyurethane Industry Co.; Colonehto L) | 2 parts by weight |

The thus obtained coating for back coat was applied to one surface of a non-magnetic substrate 10 such as polyester as shown in FIG. 1(A). During this time, the coating for back coat was applied so that the dry thickness is 1 μm. For example, the coated substrate was irradiated with a light of mercury lamp (not shown) having 120 W/m² from both the non-magnetic substrate 10 side and the back coat layer 12 side as shown by arrow F1. Thereby, the photosetting resin in the back coat layer 12 was cured so that the curing energy is 5 J/cm².

Figure 1B:
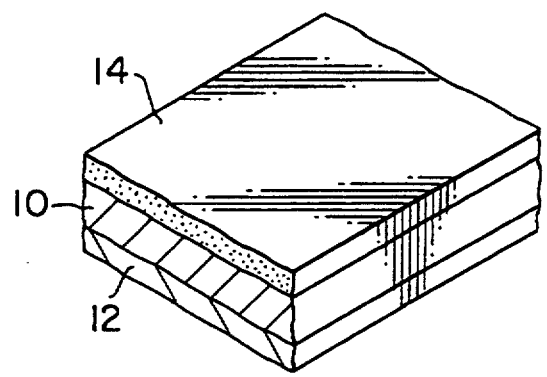

A magnetic coating composition was prepared as described below to form a magnetic layer 14 as shown in FIG. 1(B). First, a magnetic coating composition having the following formulation and weight ratios was prepared.

| | |
|---|---|
| Toluene | 25 parts by weight |
| Methyl ethyl ketone | 25 parts by weight |
| Cyclohexanone | 10 parts by weight |
| Co-modified γ-Fe₂O₃ (specific surface area; 35 m²/g) | 30 parts by weight |
| Vinyl chloride-acrylic copolymer (manufactured by Nippon Zeon Co.; MR110) | 3 parts by weight |
| Polyurethane (manufactured by Nippon Polyurethane Industry Co.; Nipporan N2301) | 3 parts by weight |
| Cr₂O₃ | 1 part by weight |
| Al₂O₃ | 3 parts by weight |

Of these, toluene, methyl ethyl ketone and cyclohexanone are solvents, vinyl chloride-acrylic copolymer and polyurethane are thermosetting resins and $Cr_2O_3$ and $Al_2O_3$ are abrasives. While the Co-modified $\gamma$-$Fe_2O_3$ is used as a magnetic powder, the present invention is not limited thereto.

These components were mixed, dispersed and thereafter the following thermosetting agent was added thereto and further dispersion was carried out.

Isocyanate curing agent 2 parts by weight

Figure 1C:
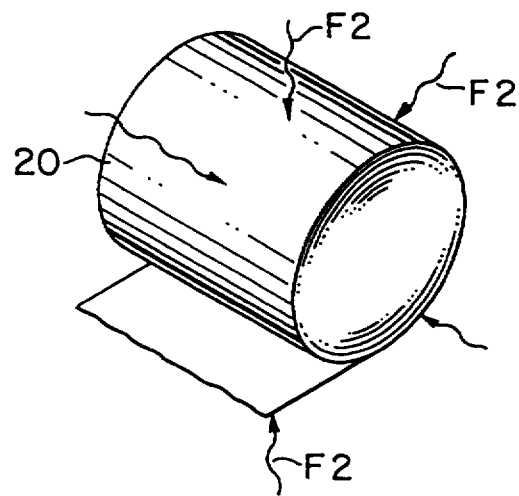

The thus obtained magnetic coating composition was applied to the other surface of the non-magnetic substrate 10 having the back coat layer 12 formed therein to form a magnetic layer 14, and predetermined treatments such as orientation and calendering were carried out. Thereafter, the double-coated substrate was wound in the form of a roll as shown in FIG. 1(C). The resulting roll was heat treated, for example, for 24 hours at 55° C. as shown by arrow F2. Thus, the thermosetting resin in the back coat layer 12 was thermoset. Thereafter, a predetermined step was carried out to obtain a magnetic recording medium of Sample 1.

b. Sample 2

Sample 2 was then prepared in the same manner as that used in Sample 1 except that polyurethane acrylate (manufactured by Toagosei Chemical Industry Co.; Aronix M 1200) was used in place of the photosetting resin, polyester acrylate used in Sample 1 described above.

c. Sample 3

Sample 3 was then prepared in the same manner as that used in Sample 1 except that isocyanurate acrylate (manufactured by Toagosei Chemical Industry Co.; M 315) was used in place of the photosetting resin, polyester acrylate used in Sample 1 described above.

d. Sample 4

Sample 4 was then prepared in the same manner as that used in Sample 1 except that epoxy acrylate (manufactured by Toagosei Chemical Industry Co.; M 5700) was used in place of the photosetting resin, polyester acrylate used in Sample 1 described above.

e. Sample 5

Sample 5 was then prepared in the same manner as that used in Sample 1 except that phosphazene-modified acrylate (manufactured by Idemitsu Petrochemical Co.; PPZ) was used in place of the photosetting resin, polyester acrylate used in Sample 1 described above.

f. Sample 6

Sample 6 was then prepared in the same manner as that used in Sample 1 except that vinyl chloride-acrylic copolymer (manufactured by Nippon Zeon Co.; MR110) was used in place of the thermosetting resin, nitrocellulose used in Sample 1 described above.

g. Sample 7

Sample 7 was then prepared in the same manner as that used in Sample 1 except that 2 parts by weight of nitrocellulose, 2 parts by weight of polyurethane and 26 parts by weight of polyester acrylate were used in place of the thermosetting resins, 5 parts by weight of nitrocellulose and 5 parts by weight of polyurethane and the photosetting resin, 20 parts by weight of polyester acrylate used in Sample 1. In other words, in Sample 7, the amounts of the thermosetting resins were reduced and the amount of the photosetting resin was increased.

h. Sample 8

Sample 8 was then prepared in the same manner as that used in Sample 1 except that 14 parts by weight of nitrocellulose, 14 parts by weight of polyurethane and 2 parts by weight of polyester acrylate were used in place of the thermosetting resins, 5 parts by weight of nitrocellulose and 5 parts by weight of polyurethane and the photosetting resin, 20 parts by weight of polyester acrylate used in Sample 1. In other words, in Sample 8, the amounts of the thermosetting resins were increased and the amount of the photosetting resin was reduced.

i. Sample 9

Sample 9 was then prepared in the same manner as that used in Sample 1 except that the thickness of the back coat layer 12 was 2 $\mu$m rather than 1 $\mu$m.

j. Sample 10

Sample 10 was then prepared in the same manner as that used in Sample 1 except that the thickness of the back coat layer 12 was 0.3 $\mu$m rather than 1 $\mu$m.

k. Sample 11

Sample 11 was then prepared in the same manner as that used in Sample 1 except that the photosetting resin composition, i.e., polyester acrylate, photopolymerization initiator, methyl ethyl ketone, and toluene were omitted.

l. Sample 12

Sample 12 was then prepared in the same manner as that used in Sample 1 except that a photosetting resin, polyester acrylate (manufactured by Toagosei Chemical Industry Co.; Aronix M 9050) was used in place of the thermosetting resins, nitrocellulose and polyurethane (manufactured by Nippon Polyurethane Industry Co.; Nipporan N2301) used in Sample 1.

m. Sample 13

Sample 13 was then prepared in the same manner as that used in Sample 1 except that 30 parts by weight of carbon black (particle size of 95 m$\mu$) were used in place of 10 parts by weight of carbon black (particle size of 17 m$\mu$) used in Sample 1 and the thickness of the back coat layer 12 was 2 $\mu$m rather than 1 $\mu$m. In other words, the light transmittance of the back coat layer was reduced.

n. Sample 14

Sample 14 was then prepared in the same manner as that used in Sample 1 except that the thermosetting agent, i.e., isocyanate curing agent used in the back coat layer 12 in Sample 1 was omitted.

The differences between Sample 1 and Samples 2 through 14 are shown in Table 1. Samples 1 through 10 are examples of the present invention and Samples 11 through 14 are Comparative Examples.

TABLE 1

| Sample No. | Feature |
|---|---|
| 2 | polyurethane acrylate as the photosetting resin |
| 3 | isocyanurate acrylate as the photosetting resin |
| 4 | epoxy acrylate as the photosetting resin |
| 5 | phosphazene-modified acrylate as the photosetting resin |
| 6 | vinyl chloride-acrylic copolymer as the thermosetting resin |
| 7 | 2 parts by weight of nitrocellulose, and 2 parts by weight of polyurethane as the thermosetting resins and 26 parts by weight of polyester acrylate as the photosetting resin |
| 8 | 14 parts by weight of nitrocellulose, and 14 parts by weight of polyurethane as the thermosetting resins and 2 parts by weight of polyester acrylate as the photosetting resin |
| 9 | the thickness of the back coat layer increased to 2 $\mu$m |
| 10 | the thickness of the back coat layer reduced to 0.3 $\mu$m |
| 11 | no photosetting resin composition |
| 12 | the photosetting resin, polyester acrylate in place of thermosetting resins, nitrocellulose and polyurethane |
| 13 | 30 parts by weight of carbon black having a particle size of 95 m$\mu$ |
| 14 | no thermosetting agent in the back coat layer |

Samples as described above were tested for the light transmittance of the back coat layer 12, the presence the generation of a tack phenomenon, the number of occurrences of drop-out, the runnability of the magnetic recording media, the extent of soil of the calender roll, and the powder falling of the back coat layer 12 during running. The results are shown in Table 2. The evaluation of runnability, calender roll soil and the powder falling of the back coat layer during running are expressed by the following symbols:

◯: good;
Δ: slightly poor;
x: poor.

TABLE 2

| Sample | Thickness of Back Coat Layer (μm) | Light Transmittance of Back Coat Layer (%) | Tackiness | Drop-out (number/min) | Runnability | Calender Roll Soil | Powder Falling of Back Coat Layer during Running |
| --- | --- | --- | --- | --- | --- | --- | --- |
| 1 | 1.0 | 4.0 | without | 11 | ○ | ○ | ○ |
| 2 | 1.0 | 4.0 | without | 7 | ○ | ○ | ○ |
| 3 | 1.0 | 4.0 | without | 9 | ○ | ○ | ○ |
| 4 | 1.0 | 4.0 | without | 9 | ○ | ○ | ○ |
| 5 | 1.0 | 4.0 | without | 5 | ○ | ○ | ○ |
| 6 | 1.0 | 4.0 | without | 8 | ○ | ○ | ○ |
| 7 | 1.0 | 4.0 | without | 10 | ○ | ○ | ○ |
| 8 | 1.0 | 4.0 | without | 10 | ○ | ○ | ○ |
| 9 | 2.0 | 4.0 | without | 8 | ○ | ○ | ○ |
| 10 | 0.3 | 45.0 | without | 16 | ○ | ○ | ○ |
| 11 | 1.0 | 4.0 | without | >100 | Δ | X | ○ |
| 12 | 1.0 | 3.0 | with | >100 | X | X | X |
| 13 | 2.0 | 0.3 | with | >100 | X | X | X |
| 14 | 1.0 | 4.0 | without | 12 | X | ○ | X |

This example is considered with reference to Table 2. In Samples 1 through 10 according to this example, there are not observed a tack phenomenon wherein the uncured resin bleeds, calender roll soil and the powder falling of the back coat layer during running. The number of occurrences of drop-out is low and the runnability is good.

The reason why such results are obtained is thought to be follows. That is, according to this example, the photosetting resin in the back coat layer 12 has already been cured when the magnetic recording media are wound. Accordingly, the back coat layer is not affected by the transfer of layers such as the non-magnetic substrate 10 and the magnetic layer 14, and thus good runnability is obtained.

Further, for this reason, the calender roll (not shown) is not soiled when the magnetic layer 14 is subjected to calendering treatment. Further, this soil is not transferred and therefore the number of occurrences of drop-out is inhibited. Because thermosetting is carried out after winding, a powder falling phenomenon does not occur wherein the powder falling phenomenon is such a phenomenon that the back coat layer 12 is peeled off during tape running to deposit it on guide rolls (not shown) or the like.

Samples 1 through 5 are compared. While various photosetting resins are used, similarly good characteristics are obtained in any case. While another thermosetting resin is used in Sample 6, similarly good characteristics are obtained.

While the ratio of the photosetting resin to the thermosetting resin was varied in Samples 7 and 8, similarly good results are obtained in any case provided that the ratio is in the predetermined range. While the thickness of the back coat layer 12 was varied in Samples 9 and 10, good results are obtained in any case provided that the thickness is in the predetermined range.

On the contrary, in Sample 11 wherein photosetting resin composition was used and only the thermosetting resins were used, calendering treatment is carried out in such a state that the back coat layer 12 is not cured and therefore there is observed the increase of drop-out due to calender roll soil.

In Sample 12 wherein the photosetting resin was used in place of the thermosetting resin, photosetting in the step shown in FIG. 1(A) does not sufficiently proceed and therefore there is observed a tack phenomenon wherein the uncured resin bleeds. Further, when winding is carried in the form of a roll, the uncured resin is transferred to layers such as the magnetic layer and thus the drop-out very increases.

In Sample 13 wherein the light transmittance of the back coat layer 12 was 0.3%, the photosetting of the back coat layer 12 does not sufficiently occur, drawbacks such as tack phenomenon, calender roll soil and powder falling of the back coat layer occur. The number of occurrences of drop-out is large. Accordingly, it is desirable that the light transmittance of the back coat layer 12 be at least 1%.

In Sample 14 wherein the thermosetting agent, isocyanate was not added even if the thermosetting resin and the photosetting resin are used, the thermosetting of the back coat layer 12 does not occur in the post-treatment step shown in FIG. 1(C) and therefore powder falling generates during tape running.

Thus, according to this example, drawbacks such as tack phenomenon, calender roll soil and powder falling of the back coat layer do not occur even if treatments such as magnetic layer coating and calendering are carried out after the back coat layer is applied. Further, it is unnecessary to use a complicated apparatus for electron beam curing and therefore magnetic recording media having excellent characteristics can be extremely easily obtained.

The present invention is not limited to the example described above and many variations thereof are possible without departing from its spirit and scope. For example, a primer layer may be interposed between the non-magnetic substrate and the magnetic layer. The magnetic layer may be provided with a top coat layer.

As stated above, in the magnetic recording media and the process therefor according to the present invention, the back coat layer contains both the thermosetting resin and the photosetting resin and the light transmittance of the back coat layer is at least 1%, as well as the back coat layer coating and photosetting are carried out, thereafter, magnetic layer coating, winding and thermosetting are carried out. Accordingly, magnetic recording media having excellent characteristics can be easily obtained without requiring any complicated apparatus.

What is claimed is:

1. A magnetic recording medium comprising a non-magnetic substrate, a magnetic layer formed on one surface of said substrate, and a back coat layer formed on the other surface of said substrate wherein said back coat layer contains a mixture of a thermosetting resin and a photosetting resin, each of said thermosetting resin and photosetting resin being 5 to 95% by weight of the total amount of the thermosetting resin and photosetting resin mixture, said thermosetting resin and photosetting resin being jointly used for curing said back coat layer, light transmittance of the back coat layer being at least 1% and an upper limit of the light transmittance being 50%.

2. The magnetic recording medium according to claim 1 wherein said back coat layer further contains a thermosetting agent.

3. The magnetic recording medium according to claim 1 wherein said photosetting resin is curable by ultraviolet rays.

* * * * *